US009264454B2

(12) United States Patent
Lidström et al.

(10) Patent No.: US 9,264,454 B2
(45) Date of Patent: Feb. 16, 2016

(54) METHOD AND ARRANGEMENT FOR IMPLEMENTING POLICY RULES IN PEER-TO-PEER COMMUNICATION

(75) Inventors: Mattias Lidström, Stockholm (SE); Mona Matti, Nacka (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 196 days.

(21) Appl. No.: 13/322,605

(22) PCT Filed: May 28, 2009

(86) PCT No.: PCT/SE2009/050614
§ 371 (c)(1),
(2), (4) Date: Nov. 28, 2011

(87) PCT Pub. No.: WO2010/138035
PCT Pub. Date: Dec. 2, 2010

(65) Prior Publication Data
US 2012/0072592 A1    Mar. 22, 2012

(51) Int. Cl.
*G06F 15/173*    (2006.01)
*H04L 29/06*    (2006.01)
(Continued)

(52) U.S. Cl.
CPC ........ *H04L 65/1016* (2013.01); *H04L 12/5695* (2013.01); *H04L 47/20* (2013.01);
(Continued)

(58) Field of Classification Search
CPC .................................................. H04L 67/104
USPC .......... 709/204–207, 220–233, 249; 370/230, 370/235, 252–254, 335, 342, 395.21, 395.4, 370/395.43, 401–404, 441; 707/E17.009; 713/1
See application file for complete search history.

(56) References Cited

U.S. PATENT DOCUMENTS

| 7,464,272 | B2 * | 12/2008 | Danieli ......................... 713/182 |
| 2005/0041584 | A1 * | 2/2005 | Lau et al. ...................... 370/235 |

(Continued)

FOREIGN PATENT DOCUMENTS

| EP | 1764951 A1 | 3/2007 |
| EP | 2045974 A1 * | 4/2009 |

(Continued)

OTHER PUBLICATIONS

3GPP TS 23.203 V7.9.0 (Dec. 2008), "3rd Generation Partnership Project; Technical Specification Group Services and System Aspects; Policy and charging control architecture (Release 7)", Dec. 2008, Global System for Mobile Communications, V 7.9.0, p. 16, 24.*

(Continued)

*Primary Examiner* — Brian J Gillis
*Assistant Examiner* — Michael A Keller
(74) *Attorney, Agent, or Firm* — Coats & Bennett, PLLC (57) ABSTRACT

Method and apparatuses for controlling a peer-to-peer communication involving media communication between a subscriber (A) and one or more opposite peers (B, C, D). When a policy node (300) detects that the peer-to-peer communication is activated for the subscriber, session parameters are determined (3:4) for the media communication based on predefined peer-to-peer service rules configured (3:1) at the policy node. The session parameters are then implemented (3:6) in an access gateway (304) that controls network resources for the media communication.

21 Claims, 4 Drawing Sheets

(51) Int. Cl.
*H04L 12/54* (2013.01)
*H04L 12/813* (2013.01)
*H04L 12/911* (2013.01)
*H04L 12/927* (2013.01)
*H04L 29/08* (2006.01)

(52) U.S. Cl.
CPC ........... *H04L 47/781* (2013.01); *H04L 47/801* (2013.01); *H04L 47/805* (2013.01); *H04L 47/824* (2013.01); *H04L 67/104* (2013.01)

(56) References Cited

U.S. PATENT DOCUMENTS

| | | | |
|---|---|---|---|
| 2005/0086329 A1* | 4/2005 | Datta et al. | 709/220 |
| 2005/0088977 A1* | 4/2005 | Roch et al. | 370/254 |
| 2006/0072451 A1 | 4/2006 | Ross | |
| 2006/0168343 A1* | 7/2006 | Ma et al. | 709/245 |
| 2008/0049648 A1 | 2/2008 | Liu et al. | |
| 2008/0095136 A1* | 4/2008 | Liu et al. | 370/342 |
| 2008/0313698 A1* | 12/2008 | Zhao et al. | 726/1 |
| 2008/0317054 A1* | 12/2008 | Yin | 370/401 |
| 2009/0013081 A1* | 1/2009 | Laroia et al. | 709/228 |
| 2009/0119292 A1* | 5/2009 | Shi | 707/6 |
| 2009/0299937 A1* | 12/2009 | Lazovsky et al. | 706/47 |
| 2009/0327395 A1* | 12/2009 | Park et al. | 709/202 |
| 2010/0198842 A1* | 8/2010 | Giraudon et al. | 707/754 |
| 2011/0082940 A1* | 4/2011 | Montemurro et al. | 709/227 |
| 2012/0163235 A1* | 6/2012 | Ho et al. | 370/254 |
| 2012/0276863 A1* | 11/2012 | Li et al. | 455/226.1 |

FOREIGN PATENT DOCUMENTS

| | | |
|---|---|---|
| JP | 2009151531 A | 7/2009 |
| JP | 2011504311 A | 2/2011 |
| WO | 2009024183 A1 | 2/2009 |
| WO | 2009049684 A1 | 4/2009 |

OTHER PUBLICATIONS

Oda, T. et al., "IMS: Achieving a new communication style." Information Processing, vol. 50, No. 4, pp. 311-318, Apr. 15, 2009. Information Processing Society of Japan, Tokyo, Japan.

* cited by examiner

METHOD AND ARRANGEMENT FOR IMPLEMENTING POLICY RULES IN PEER-TO-PEER COMMUNICATION

TECHNICAL FIELD

The invention relates generally to a method and arrangement for handling peer-to-peer sessions to control traffic and enable improved performance.

BACKGROUND

Various multimedia services have been developed for packet-based communication using IP (Internet Protocol), typically involving transmission of media in different formats and combinations between communication nodes such as fixed or mobile telephones, computers and servers. An architecture called "IP Multimedia Subsystem" (IMS) has also been developed by the 3$^{rd}$ Generation Partnership Project (3GPP) to enable such multimedia services and sessions for user terminals connected to different access networks.

Multimedia sessions can be handled e.g. by using the signalling protocol "SIP" (Session Initiation Protocol) for controlling setup of the sessions in an IMS network. A communication terminal connected to an access network may thus send a message called "SIP INVITE" to initiate a session with another communication terminal or with a server, e.g. when a multimedia application has been invoked in the terminal. The SIP INVITE message triggers different actions in the IMS network and the access network for establishing the session, including reservation of appropriate resources in the access network used.

A policy node associated to the access network is also typically used to control sessions for terminals based on various predetermined policy rules and subscription profiles, including reservation of network resources in the access network. For example, different QoS (Quality of Service) requirements can be enforced by the policy node for the above resource reservation, e.g. with respect to data bitrates and latency. The policy node is also responsible for authorising and admitting communication sessions for terminals connected to the access network, based on the predefined policy rules. In 3GPP, the policy node is often referred to as a function called PCRF (Policy and Charging Rule Function).

A media session according to a requested IP service is typically established for a user terminal by means of an application function that enables the IP service. The application function may belong to an IMS network or be implemented in a separate application server. When setting up the session, the policy node communicates various service related messages with both the application function and a gateway node in the access network in order to establish appropriate communication parameters for the session.

Sessions can also be established and handled solely by the participating parties without involving any intermediate IMS network or policy node, generally referred to as peer-to-peer (P2P) sessions, which cannot however be controlled in the manner described above. A P2P network does not have the notion of clients or servers but only equal peer nodes that simultaneously function as both "clients" and "servers" to the other nodes on the network. This model of network arrangement differs from the client-server model where communication of media is usually to and from a central server.

In a P2P session, data is transmitted in data packets between the peers and the data packets are routed through an IP network, e.g. the Internet, over various routers each having their own mechanisms and policies for handling different data flows. However, the routers are typically not concerned with what data the packets contain, i.e. the media or content being communicated, or what service is used, and there is no standardised or consistent mechanism today for controlling such peer-to-peer sessions in terms of admission and QoS related parameters.

Peer-to-peer applications on the Internet are becoming ever more common and popular, e.g. for downloading various multimedia content such as music and films. For example, a technique referred to as "Bit Torrent" is a very powerful distribution mechanism that can be used for rapid sharing of multimedia content and computer programs over the Internet without requiring a traditional centralized content server, effectively avoiding the "traffic bottleneck" associated therewith.

According to this and similar mechanisms, a tracker node is contacted to find out basically in which nodes, or "peers", a particular media object is available. After receiving a list of peers from the tracker node, different parts of the total content can be downloaded simultaneously from multiple peers in the list and these content parts are then compiled at the receiving node to form the complete content which may include one or more content files. Furthermore, so-called Distributed Hash Tables, DHT:s, are typically used in the tracker node for identifying and selecting the peers for downloading.

Figure 1:
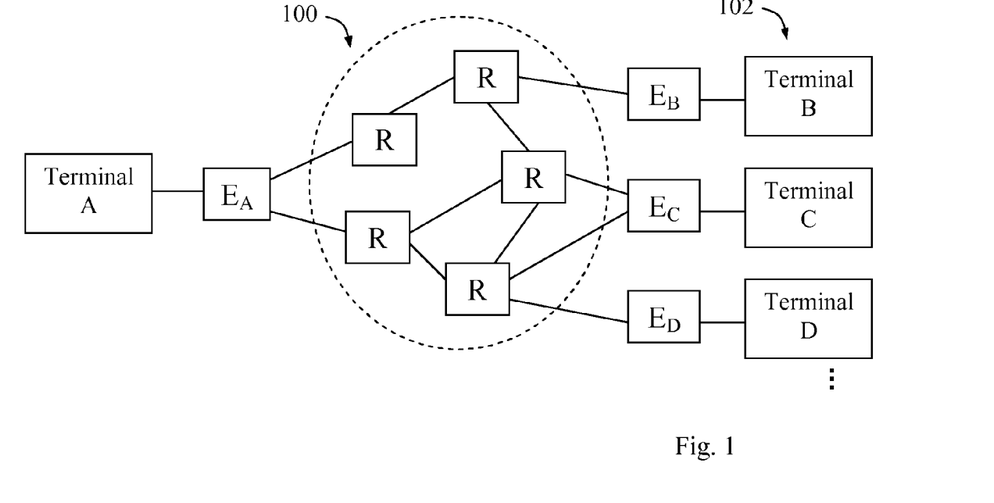
FIG. 1 illustrates peer-to-peer sessions between a user terminal A and a plurality of opposite peers B, C, D . . . over routers R in an IP network.

In FIG. 1, a typical scenario is shown for a plurality of peer-to-peer sessions between a user terminal A and multiple opposite communication nodes B, C, D, . . . over routers R in an IP network 100, e.g. for downloading different content parts from these nodes to terminal A, e.g. according to Bit Torrent. In this example, terminal A is connected to an access gateway or "edge node" $E_A$, e.g. a GGSN (Gateway GPRS Support Node) if a mobile access network is used, while the shown opposite communication nodes B, C, D are connected to corresponding edge nodes $E_B$, $E_C$ and $E_D$, respectively. The transmission path for each peer-to-peer session typically runs over multiple intermediate routers R in the network 100, which may vary for different data packets during the session, which is well-known in the art. However, it is also a well-known fact that this type of mechanisms are extensively used today for illegally or illicitly spreading of content and computer programs over the Internet, i.e. without consent or control whatsoever by the content owners. Due to this lack of control, there are basically no constraints or limitations for distributing illegal or unsuitable material in this manner.

It is also a drawback with P2P sessions that no QoS can be guaranteed, e.g. in terms of transfer speed and delays, for the participating communication parties. The users are mainly dependent on the performance of underlying protocols such as sliding windows or other mechanisms implemented besides the basic P2P protocols, e.g. involving variable bitrates to create a data stream adequate for the application used. This may be a problem for real time applications where delay and jitter are critical, or when a certain download time is desirable. Another drawback associated with unrestrained P2P sessions is the amount of traffic that can be generated beyond control in the networks involved, which may result in congestion, bottlenecks, excessive processing and costs, interference and other problems.

SUMMARY

It is an object of the invention to address at least some of the issues outlined above. In particular, it is an object to enable control of peer-to-peer sessions and to enable a certain QoS for such sessions. These objects and others can be obtained by providing a method and apparatuses according to the independent claims attached below.

According to one aspect, the invention involves a method in a policy node for controlling a peer-to-peer communication involving media communication between a subscriber and one or more opposite peers. In this method, it is detected, either through detection of signalling with an application function or detection of peer-to-peer traffic, that the peer-to-peer communication is activated for the subscriber. Session parameters are then determined for the media communication between the subscriber and opposite peer(s) based on predefined peer-to-peer service rules configured at the policy node. An access gateway, responsible for establishing and controlling network resources, is then ordered to implement the session parameters for the media communication between the subscriber and opposite peer(s). Thereby, the peer-to-peer session can be controlled, e.g. to prevent illicit or unsuitable communication, and a certain QoS can also be provided for the subscriber.

According to another aspect, the invention involves a policy node configured to perform the method above. The policy node thus comprises a detecting unit adapted to detect that the peer-to-peer communication is activated for the subscriber, a determining unit adapted to determine the session parameters, and an ordering unit adapted to order the access gateway to implement the session parameters for the media communication.

The invented method and policy node and application function may be implemented according to any of the following optional embodiments.

In one embodiment, the peer-to-peer communication is detected through detection of signalling with an application function which is invoked for executing the peer-to-peer communication for the subscriber, and a policy negotiation is performed with the application function for determining the session parameters. In that case, a list of candidate peers available for communication with the subscriber may be received from the application function during the policy negotiation, and the list can be used by the policy node to determine which peers are allowed or not for the session according to the predefined peer-to-peer service rules.

In an alternative embodiment, the peer-to-peer communication is detected through detection of peer-to-peer traffic when traffic in the media communication is detected by a traffic detector, e.g. a packet inspector or an active probing mechanism.

According to further possible embodiments, a service session may be created for a plurality of individual media sessions for the media communication using the session parameters, and the individual media sessions are then binded to the service session towards the policy node. Creating the service session may include storing the session parameters and peers involved in the media communication, in a session database connected to the policy node.

It is also possible to monitor the media communication by means of a counter function sensitive to data flows in the media communication with respect to the determined session parameters. If an individual media session is terminated, the counter function can be adjusted to allow for a new individual media session.

The peer-to-peer service rules could be defined as relating to at least one of: bandwidth, latency, QoS, type of media, amount of media, subscription parameters, identity of current user, location of current user, number of peer-to-peer sessions, router domain(s) of the opposite peer(s), identity of opposite peer(s), location of opposite peer(s), current time of day, week or season, uplink or downlink radio communication, and currently available network bandwidth. Thereby, the media communication can be controlled by determining the session parameters depending on any one or more of these factors. Furthermore, the predefined peer-to-peer service rules may have been derived from subscriber information stored in a Subscription Profile Repository connected to the policy node.

If an application function is involved, it could be implemented in an application server connected to an IMS network serving the subscriber and possibly also the opposite one or more peers. If the subscriber is connected to a mobile access network, the access gateway may be a GGSN and the policy node may include a PCRF. On the other hand, if the subscriber is connected to a fixed access network, the access gateway may be an edge router and the policy node may include a RACS (Resource and Admission Control Subsystem) and a NASS (Network Attachment Subsystem).

According to yet another aspect, the invention involves an application function configured to enable control of the peer-to-peer communication involving media communication between a subscriber and one or more opposite peers. The application function comprises a service unit adapted to initiate and execute the peer-to-peer communication for the subscriber. The application function further comprises a determining unit adapted to determine one or more peers available for communication with the subscriber when the application function is invoked to execute the peer-to-peer communication for the subscriber. The application function also comprises a negotiation unit adapted to perform a policy negotiation with a policy node to determine session parameters for the media communication based on predefined peer-to-peer service rules configured at the policy node, and a sending unit adapted to send a list with the determined one or more peers to the policy node.

Thereby, the application function is able to interact with the policy node in the manner described, in order to accomplish the above-mentioned benefits of enabling control and a certain QoS for the peer-to-peer session in cases where the application function is involved. The negotiation unit may be further adapted to send a list with allowed peers to the subscriber, effectively indicating which peers the subscriber is allowed to communicate with.

Further features of the invention and its benefits will be explained in the detailed description below.

BRIEF DESCRIPTION OF THE DRAWINGS

The invention will now be described in more detail by means of preferred embodiments and with reference to the accompanying drawings, in which.

DETAILED DESCRIPTION

The invention can be used to control peer-to-peer sessions with one or more communication nodes for a subscriber, e.g. with respect to admission and QoS related parameters such as bitrates and latency. In this description, the term peer-to-peer is denoted "P2P" for short. Briefly described, a policy node, such as the existing PCRF node, is utilised for enforcing specific session parameters in an access gateway that provides network resources for the session. The session parameters are determined for a detected P2P communication based on predefined P2P service rules. In this description, the term "P2P communication" is used to represent the communication of media between peers using the P2P technique described above, without limitation to any particular P2P service.

P2P communications may be activated for subscribers either by means of control signalling with an application function, which can be referred to as "cooperative services", or without using an application function, which can be referred to as "non-cooperative services". The P2P communication can be detected either through detection of the above control signalling with an application function, or through detection of peer-to-peer traffic, which will be called "signalling detection" and "traffic detection", respectively, in the following. These options can be handled according to the embodiments to be described below.

In the following exemplary embodiments and throughout the description, the term "subscriber" generally represents an end-user and his/her communication equipment used when establishing and executing services in the manner described herein, e.g. by means of a UA (User Agent) or the like implemented in a user terminal capable of P2P communication. The communication equipment of the subscriber may be a wireless or fixed telephone, computer, server, game unit or television equipment such as an IPTV client, Set Top Box, etc. The invention is thus not limited to any particular communication equipment of the subscriber.

Figure 2:
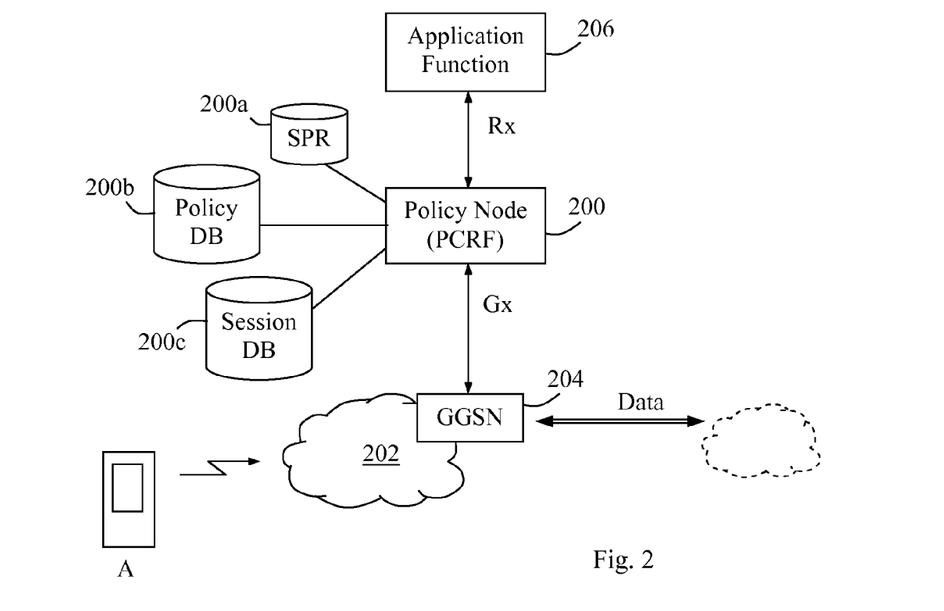
FIG. 2 is a schematic block diagram illustrating a communication scenario involving a policy node 200, which can be utilised for this solution.

FIG. 2 illustrates a typical communication scenario involving a policy node 200 such as PCRF, which may be utilised for implementing the embodiments described below. A mobile terminal A representing a subscriber, is connected to a mobile access network 202 containing a GGSN node 204 as "access gateway" or similar, for media communication (Data) with an opposite party, not shown, according to an IP service invoked from an application function 206. The policy node 200 has access to subscriber information stored in an SPR (Subscription Profile Repository) 200a and to policy rules stored in a policy database 200b, and may be configured to perform conventional policy functions as described above. The application function 206 may belong to a network of an IMS operator, or may reside in an IMS independent third party application server.

When establishing a communication session in a conventional manner according to 3GPP, e.g. 3GPP Technical Specification 23.203, various service-related messages are exchanged between the application function 206 and the policy control node 200 over an Rx interface, and between the GGSN node 204 and the policy control node 200 over a Gx interface, both interfaces typically using the protocol called "DIAMETER". Further, various session parameters are normally stored in a session database 200c as long as the session is active. As mentioned above, the policy node can be utilised for controlling P2P sessions as well, which will now be described in more detail firstly with reference to an exemplary process illustrated in FIG. 3.

Figure 3:
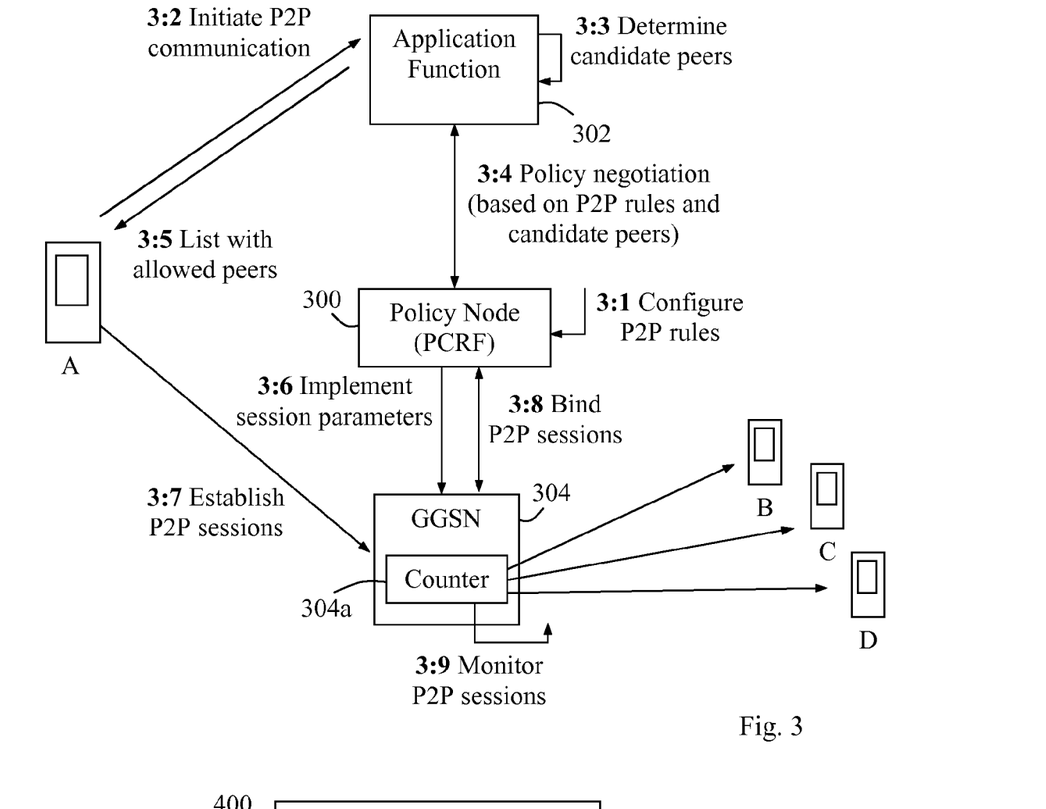
FIG. 3 is a schematic block diagram illustrating a procedure for controlling a peer-to-peer communication for a subscriber A when activated by means of an application function, according to one embodiment.

In FIG. 3, a policy node 300 is connected to an application function 302 as well as to a GGSN 304 acting as access gateway for a subscriber A, in this case a mobile terminal. The access gateway or GGSN 304 is responsible for establishing and controlling network resources for media communication between the subscriber and opposite peer(s). The application function 302 may be a tracker node that the subscriber A will contact to establish a P2P session. A first step 3:1 illustrates that specific P2P service rules are configured in the policy node 300 which are valid for subscriber A when executing P2P sessions with opposite peers A, B, C, . . . , which can thus be seen as a preparatory configuring phase of the process.

The P2P service rules can be configured in several different ways, without limiting this invention. For example, maximum or minimum limits may be set for specific communication parameters that the subscriber is allowed or entitled to, related to QoS, e.g. bandwidth and latency. The P2P service rules may also be dependent on the type of media used, or dictate the amount or "size" of media allowed, or be related to specific subscription parameters. The P2P service rules may further depend on the identity of a current user and the current location of the user, as well as the number and/or identity of opposite peers. The P2P service rules may thus be configured to block certain candidate peers for a particular user, e.g. for specific types of media, and so forth.

The P2P service rules may also control from which router domain(s) the media can be transferred (sometimes referred to as DMZ, Demilitarised Zones), which may be controlled by means of a wildcard for the source IP addresses to restrict the domains allowing media transfer. This restriction for media transfer may be based on peering agreements or similar between different router domains.

The P2P service rules may also relate to the current time of day, week or season, whether the service involves uplink or downlink radio communication, and the currently available network bandwidth. For example, these parameters can be used to control the P2P traffic to avoid traffic congestion in the network. The above examples of P2P service rules are not exhaustive and the invention is generally not limited to any particular P2P service rule.

After configuring the P2P service rules, the following steps in FIG. 3 refer to a run-time phase of the process when media sessions are handled. Thus, subscriber A initiates or invokes a P2P communication from the application function 302, in a step 3:2, typically by contacting a tracker node as described above or other node capable of retrieving tracker information from a DHT. According to regular procedures, the application function 302, e.g. a tracker node, determines which available or "candidate" peers subscriber A can connect to for the invoked P2P communication, in a next step 3:3.

Activation of the P2P communication in application function 302 triggers a policy negotiation with the policy node 300 when session parameters are determined for the P2P communication based on the previously configured P2P service rules, as illustrated by a step 3:4. The term "session parameters" is used here to represent any session flow characteristics impacting the forthcoming media flow. Some examples of session parameters are: bitrate, latency, source, destination, media size (i.e. traffic amount), port, protocol used and number of peers involved. In this case, the policy node will basically detect the P2P communication by detecting the signalling with the application function 302. In other situations, a P2P communication may alternatively be detected through traffic detection when one or more sessions for a P2P communication have already started, which will be described later on with reference to FIG. 6.

In the policy negotiation of step 3:4, the application function 302 also provides a list of the candidate peers determined in step 3:3, to the policy node 300. This negotiation may involve various messages exchanged over an Rx interface between the application function 302 and the policy node 300, or other interfaces may alternatively be used, e.g., based on Web Services or XML (Extensible Mark-up Language).

During the policy negotiation, policy node 300 checks the P2P service rules valid for subscriber A which are thus applied for the negotiation, as well as considering the determined candidate peers. It should be noted that possibly the policy node does not allow one or more of the proposed candidate peers for the session, depending on the P2P service rules as described above. The negotiation may thus include determination of which peers are allowed or not for the session according to the P2P service rules, in addition to establishing the session parameters.

A list with one or more allowed peers A, B, C, . . . is also sent from the application function 302 to the subscriber, as shown in a step 3:5. If the P2P rules did not impose any restriction of peers, the list of allowed peers in step 3:5 can be equal to the list of candidate peers provided in step 3:4. The policy node 300 may also create an open session entry in the session database, see 200c in FIG. 2, based on the P2P service rules and outcome of the negotiation, that is, the resulting session parameters and the allowed peers are stored in the session database.

The policy node 300 also orders the access gateway 304 to implement the established session parameters, in a next step 3:6, thereby controlling the forthcoming media communication in accordance with the P2P service rules, as described above. In more detail, policy node 300 orders access gateway 304, by means of a suitable message, to apply the session parameters when transferring media in individual media sessions with different peers. In the case of a 3GPP network, for example, this message can be a Credit Control Request, or "CCR" message, from the policy node to the access gateway, and any subsequent modifications can be done by initiating Reauthorisation from the policy node over the Diameter based Gx interface.

Then, in a further step 3:7, subscriber A is able to establish individual media sessions with one or more of the allowed peers A, B, C, . . . according to the list received in step 3:5 above. The access gateway 304 may also create a service session with the established session parameters and the individual media sessions can be binded to the service session towards the policy node, as shown in an optional next step 3:8. A single common service session will then effectively be used for signalling to control the multiple media sessions. Creating the service session includes storing the session parameters and peers involved in the media communication, in a session database connected to the policy node, such as the session database 200c shown in FIG. 2.

In the communication of steps 3:6 and 3:8, various messages may exchanged over a Gx interface or similar between the access gateway 304 and the policy node 300. If the policy node is a PCRF and the access gateway is a GGSN, a "Policy Decision Point PDP" in the PCRF can be used in step 3:6 to implement the session parameters in a "Policy Enforcement Point PEP" in the GGSN.

A counter function is then used during the service session for monitoring, in each individual P2P session, various parameters relevant with respect to the implemented session parameters, as shown in a final step 3:9. For example, the currently used bitrate may be monitored in each individual P2P session relative to the allowed bandwidth for uplink or downlink radio communication. In the example shown in FIG. 3, a counter 304a is implemented in the GGSN 304, although it is also possible to implement the counter in the Policy node 300 which however would require messaging over the Gx interface regarding the individual media communications. The counter function could also be named a monitoring unit or the like.

It is possible also to update and implement new session parameters in the access gateway 304 during an ongoing service session, e.g. if dynamic P2P service rules are used and the conditions for some reason change. Furthermore, if one individual P2P session is terminated, e.g. due to a lost connection, the counter is adjusted to allow for a new P2P session within the ongoing service session. Although the above example has been described for downloading media from one or more peers B, C, D . . . , media could also be distributed or uploaded from subscriber A to the opposite peers A, B, C, . . . . and the invention is not generally limited to any particular transfer direction of the media.

A procedure executed in a policy node, e.g. node 300, for controlling a P2P communication according to another example, will now be described with reference to the flow chart in FIG. 4. The P2P communication will involve media communication between a subscriber and one or more opposite peers. In a first step 400, it is detected that the P2P communication is activated for the subscriber, which can be done either through signalling detection or traffic detection as mentioned above. In a next step 402, predefined P2P service rules are checked which have been configured for the subscriber at the policy node, e.g. as described above for step 3:1.

It is then determined, in a following step 404, whether the subscriber can be allowed to conduct media communication or sessions with one or more peers for the detected P2P communication, in accordance with the P2P service rules. If not, the service is denied, i.e. rejected or blocked, in a further step 406. If allowed, session parameters are determined for media communication in the P2P communication, based on the P2P service rules, in a step 408. The session parameters determined above are then implemented in an access gateway responsible for establishing and controlling network resources for the media communication between the subscriber and opposite peer(s). The policy node thus orders the access gateway to implement the session parameters, as shown in a final step 410.

Figure 4:
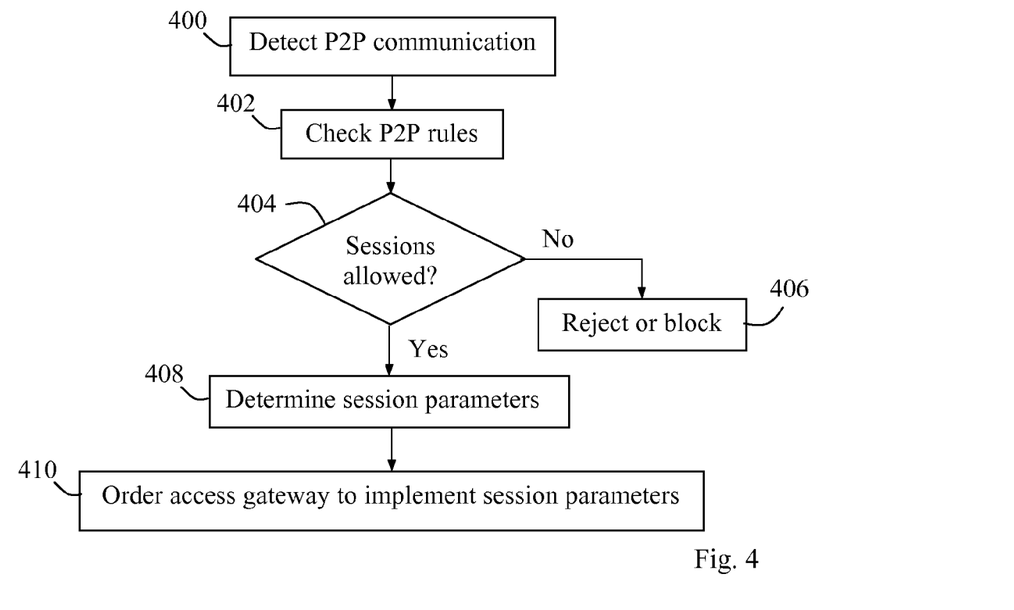
FIG. 4 is a flow chart illustrating a procedure for controlling a peer-to-peer communication, according to another embodiment.

The above procedure of FIG. 4 can be implemented in practice in different ways. For example, the predefined P2P service rules may have been installed in a policy database connected to the policy node, e.g. the policy database 200b in FIG. 2. Among other things, the P2P service rules may have been derived from subscriber information stored in a Subscription Profile Repository connected to the policy node, e.g. the SPR 200a in FIG. 2.

The application function could be implemented in an application server in a network of an IMS operator serving the subscriber, or in an IMS independent third party application server. The opposite one or more peers may also be served by the IMS network. The subscriber may be connected to a mobile access network, or to a fixed access network, e.g. using the specification of TISPAN (Telecommunications and Internet converged Services and Protocols for Advanced Networking), where the access gateway is an edge router and the policy node is a "Resource and Admission Control Subsystem RACS". In the latter case, a "Network Attachment Subsystem NASS" can be used for storing the P2P service rules and other subscriber information, while the counter function can be implemented in the RACS.

Next, some possible arrangements in a policy node and an application function, respectively, will be described in more detail with reference to the block diagram in FIG. 5. Thus, the policy node 500 is configured to control a P2P communication involving media communication between a subscriber and one or more opposite peers. The policy node 500 comprises a detecting unit 500a adapted to detect that the P2P communication is activated for the subscriber, i.e. during a run-time phase, either through signalling detection from the application function 502 or traffic detection from a traffic detector 506, as described above.

The policy node 500 also comprises a determining unit 500b adapted to determine session parameters SP for the media communication of the detected P2P communication, based on predefined service rules that have been configured in a policy database 500c at the policy node 500 during a preparatory configuring phase. The policy node 500 further comprises an ordering unit 500d adapted to order an access gateway 504, responsible for establishing and controlling network resources, to implement the determined session parameters SP for the media communication between the subscriber and the opposite peer(s).

The application function 502 is also basically configured to enable the control of the P2P communication for the subscriber when communicating with the opposite peer(s). The application function 502 comprises a service unit 502a adapted to initiate and execute the P2P communication for the subscriber, e.g. in response to a schematically shown service request R. The detecting unit 500a in policy node 500 may detect the initiated P2P communication by detecting the signalling with the application function 502, as indicated by a dashed arrow.

The application function 502 further comprises a determining unit 502b adapted to determine one or more peers available for communication with the subscriber when the application function is invoked to execute the P2P communication for the subscriber, which can be done according to regular procedures, e.g., if the function 502 resides in a tracker node using a DHT.

Application function 502 also comprises a negotiation unit 502c adapted to perform a policy negotiation PN with the policy node 500, to determine session parameters for the media communication based on the predefined P2P service rules 500c configured in the policy node 500. Application function 502 finally comprises a sending unit 502d adapted to send a list L with the determined one or more candidate peers to the policy node 500 which have been determined and provided by the determining unit 502b as indicated in the figure. In that case, the list L can be used by the determining unit 500b to determine which peers are allowed or not for the session according to the P2P service rules, during the policy negotiation PN. The negotiation unit 502c may then send a list L' with allowed peers to the subscriber, effectively indicating which peers the subscriber is allowed to communicate with.

Figure 5:
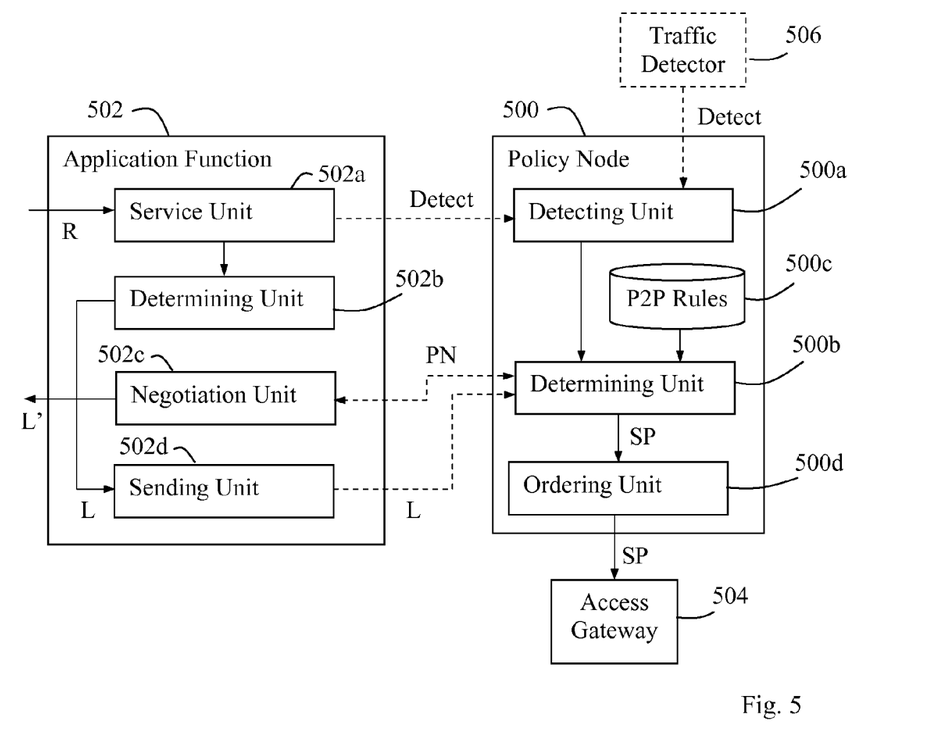
FIG. 5 is a schematic block diagram illustrating in more detail a policy node and an application function, according to further embodiments.

It should be noted that FIG. 5 merely illustrates various functional units in the policy node 500 and the application function 502 in a logical sense. However, the skilled person is free to implement these functions in practice using any suitable software and hardware means. Thus, the invention is generally not limited to the shown structures of the policy node 500 and application function 502.

As mentioned above, a P2P communication for a subscriber may be detected by detecting traffic in the media communication when the service has already been started, and in a case when no application function needs to be involved in this process. The media traffic could then be detected by means of a packet inspector or an active probing mechanism that senses the traffic that flows through the access gateway serving the subscriber, which will now be briefly described with reference to the somewhat simplified FIG. 6.

Figure 6:
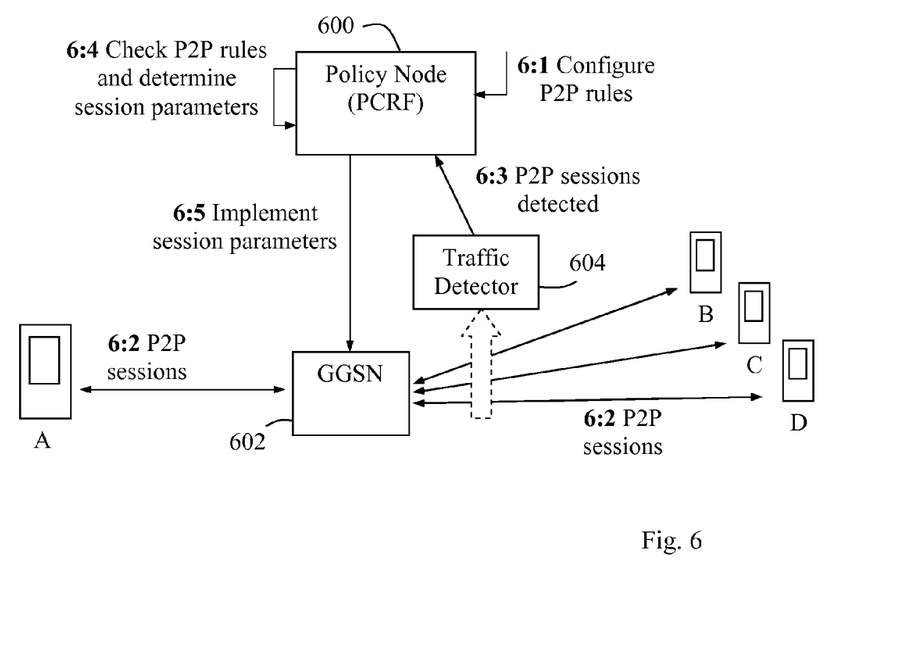
FIG. 6 is a schematic block diagram illustrating a procedure for controlling an already activated peer-to-peer communication for a subscriber A, according to yet another embodiment.

In this example, a policy node 600, e.g. PCRF, is used when a subscriber A has already started a P2P communication and communicates media with one or more opposite peers B, C, D . . . over an access gateway 602, as yet in an uncontrolled manner.

A first step 6:1 illustrates configuration of P2P service rules for subscriber A which can be made in a preparatory configuring phase, i.e. as in step 3:1 above. A next step 6:2 illustrates that subscriber A activates the P2P communication and starts media communication with the opposite peer(s) in one or more individual P2P sessions. In a following step 6:3, a traffic detector 604, e.g. a packet inspector or an active probing mechanism, detects the media traffic and ongoing P2P communication and sends a suitable traffic detection report or notification to the policy node 600. In response thereto, policy node 600 checks the previously configured P2P service rules and determines appropriate session parameters accordingly, in a further step 6:4.

The policy node 600 then orders the access gateway 602 to implement the session parameters in a following step 6:5. In this process, policy node may also decide that one or more of the opposite peers B, C, D . . . can actually not be allowed for media communication with the subscriber, as dictated by the P2P service rules, and therefore block the sessions with those peers at gateway 602 in the implementing step 6:5. Thereby, the P2P communication will be controlled "on the fly", and without requiring signalling with an application function.

Figure 7:
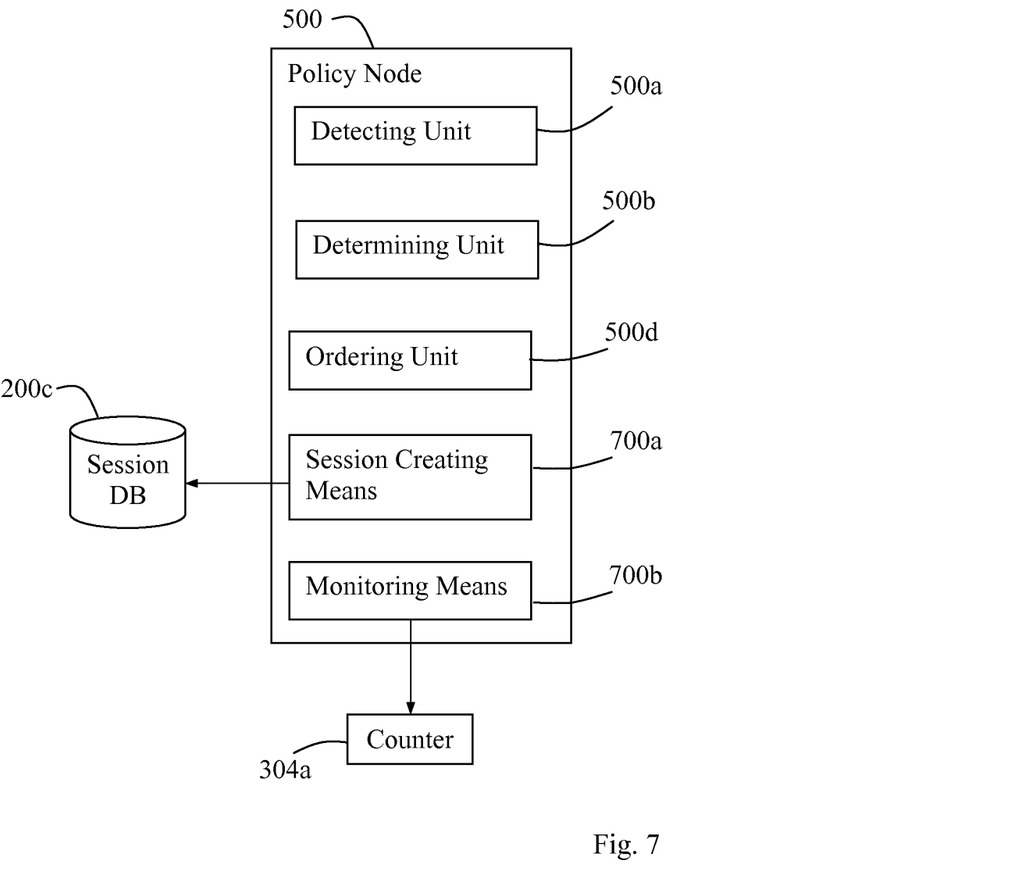
FIG. 7 is a schematic block diagram illustrating a policy node with various functional means, according to further embodiments.

The Policy node 500 shown in FIG. 5 may optionally comprise further functional means which are illustrated in FIG. 7. In addition to the above-described detecting unit 500a, determining unit 500b and ordering unit 500d, the policy node may also comprise session creating means 700a adapted to create a service session for a plurality of individual media sessions for the media communication using the session parameters, as described above for step 3:8. The session creating means 700a further binds the individual media sessions to the service session towards the policy node. The session creating means may be further adapted to create the service session by storing the session parameters and peers involved in the media communication, in a session database 200c connected to the policy node.

The policy node 500 may further comprise monitoring means 700b adapted to monitor the media communication by means of a counter function 304a, see also FIG. 3, which is sensitive to data flows in the media communication with respect to the determined session parameters. The monitoring means may be further adapted to adjust the counter function if one individual media session is terminated, to allow for a new individual media session.

By implementing this solution according to any of the embodiments described above, it is possible to provide, or even guarantee, a certain level of bitrate, bandwidth, latency and/or QoS for subscribers when involved in P2P communications, which will ultimately enable enhanced end user experience. Furthermore, media traffic in the networks can be controlled, e.g. to avoid congestion as well as illegal, illicit or generally unsuitable P2P communication.

While the invention has been described with reference to specific exemplary embodiments, the description is in general only intended to illustrate the inventive concept and should not be taken as limiting the scope of the invention. For example, the nodes GGSN, tracker and PCRF have sometimes been used when describing the above embodiments, although any other protocols and nodes with the functions above may basically be used, e.g. according to TISPAN (Telecommunications and Internet converged Services and Protocols for Advanced Networking) and ITU-T (International Telecom Union). The invention is defined by the appended claims.

The invention claimed is:

1. A method in a policy node for controlling a peer-to-peer communication involving media communication between a subscriber and one or more opposite peers, the method comprising:
    detecting that the peer-to-peer communication is activated for the subscriber by detecting signaling associated with an application function that is invoked to execute the peer-to-peer communication for the subscriber;
    determining session parameters for the media communication between said subscriber and the one or more opposite peers based on predefined peer-to-peer service rules, wherein the peer-to-peer service rules have been configured at the policy node as valid for said subscriber when executing peer-to-peer sessions with the one or more opposite peers, and wherein a policy negotiation is performed with the application function to determine said session parameters based on the predefined peer-to-peer service rules, and wherein a list of candidate peers available for communication with the subscriber is received from the application function during the policy negotiation and the candidate peers are considered according to the predefined peer-to-peer service rules; and
    ordering an access gateway configured to establish and control network resources, to implement said session parameters for the media communication between said subscriber and the one or more opposite peers, to control the media communication in accordance with the predefined peer-to-peer service rules.

2. The method of claim 1 wherein the list is used by the policy node to determine which peers are allowed or not allowed for the session according to the predefined peer-to-peer service rules.

3. The method of claim 1 wherein a service session is created for a plurality of individual media sessions for the media communication using said session parameters, and wherein the individual media sessions are bound to the service session towards the policy node.

4. The method of claim 3 wherein creating the service session includes storing said session parameters and information associated with the peers involved in the media communication, in a session database connected to the policy node.

5. The method of claim 1 wherein the media communication is monitored using a counter function sensitive to data flows in said media communication with respect to the determined session parameters.

6. The method of claim 5 wherein if an individual media session is terminated, the counter function is adjusted to allow for a new individual media session.

7. The method of claim 1 wherein said predefined peer-to-peer service rules relate to at least one of: a bandwidth, latency, Quality of Service (QoS), a type of media, an amount of media, subscription parameters, identity of current user, location of current user, number of peer-to-peer sessions, router domain(s) of the one or more opposite peers, identity of the one or more opposite peers, location of the one or more opposite peers, a current time of day, a week or season, an uplink or downlink radio communication, and a currently available network bandwidth.

8. The method of claim 1 wherein the predefined peer-to-peer service rules have been installed in a policy database connected to the policy node.

9. The method of claim 1 wherein the predefined peer-to-peer service rules are derived from subscriber information stored in a Subscription Profile Repository connected to the policy node.

10. The method of claim 1 wherein the application function is implemented in an application server connected to an IMS network serving the subscriber.

11. The method of claim 10 wherein the one or more opposite peers are also served by the IMS network.

12. The method of claim 1 wherein:
    the subscriber is connected to a mobile access network;
    the access gateway comprises a Gateway GPRS Support Node (GGSN); and
    the policy node includes a Policy and Charging Rules Function (PCRF).

13. The method of claim 1 wherein:
    the subscriber is connected to a fixed access network;
    the access gateway comprises an edge router; and
    the policy node includes a Resource and Admission Control Subsystem (RACS) and a Network Attachment Subsystem (NASS).

14. A policy node configured to control a peer-to-peer communication involving a media communication between a subscriber and one or more opposite peers, the policy node comprising:
    a processing circuit configured to:
    detect that the peer-to-peer communication is activated for the subscriber by detecting signaling associated with an application function that is invoked to execute the peer-to-peer communication for the subscriber;
    determine session parameters for the media communication based on predefined peer-to-peer service rules, wherein the predefined peer-to-peer service rules have been configured at the policy node as valid for said subscriber when executing peer-to-peer sessions with one or more opposite peers;
    perform a policy negotiation (PN) with the application function to determine said session parameters based on the predefined peer-to-peer service rules; and
    receive a first list of candidate peers available for communication with the subscriber from the application function during the policy negotiation, wherein the candidate peers are considered according to the predefined peer-to-peer service rules; and
    order an access gateway that is responsible for establishing and controlling network resources, to implement said session parameters (SP) for the media communication between said subscriber and the one or more opposite peers, to control the media communication in accordance with the predefined peer-to-peer service rules.

15. The policy node of claim 14 wherein the processing circuit is further configured to use the first list to determine which peers are allowed or not allowed for the session according to the predefined peer-to-peer service rules.

16. The policy node of claim 14 wherein the processing circuit is further configured to:

create a service session for a plurality of individual media sessions for the media communication using said session parameters; and bind the individual media sessions to the service session towards the policy node.

17. The policy node of claim 14 wherein the processing circuit is further configured to create the service session by storing said session parameters and peers involved in the media communication, in a session database connected to the policy node.

18. The policy node of claim 14 wherein the processing circuit is further configured to monitor the media communication using a counter function sensitive to data flows in said media communication with respect to the determined session parameters.

19. The policy node of claim 18 wherein the processing circuit is further configured to adjust the counter function if one individual media session is terminated, to allow for a new individual media session.

20. The policy node of claim 14 wherein said predefined peer-to-peer service rules relate to at least one of: a bandwidth, latency, a Quality of Service (QoS), a type of media, an amount of media, subscription parameters, an identity of a current user, a location of the current user, a number of peer-to-peer sessions, one or more router domains of the one or more opposite peers, an identity of the one or more opposite peers, a location of the one or more opposite peers, a current time of day, a week or season, an uplink or downlink radio communication, and a currently available network bandwidth.

21. A server in a communications network, the server comprising:

a processing circuit configured to enable control of a peer-to-peer communication involving media communication between a subscriber and one or more opposite peers, and to:

initiate and execute said peer-to-peer communication for the subscriber;

determine one or more peers available for communication with the subscriber when the application function is invoked to execute said peer-to-peer communication for the subscriber;

perform a policy negotiation (PN) with a policy node to determine session parameters for the media communication based on predefined peer-to-peer service rules between the subscriber and the one or more opposite peers, wherein the predefined peer-to-peer service rules have been configured at the policy node as valid for said subscriber when executing peer-to-peer sessions with opposite peers;

send a first list with the determined one or more peers to the policy node, to enable the policy node to control the media communication in accordance with the predefined peer-to-peer service rules and said list; and send a second list with allowed peers to the subscriber, to indicate which peers the subscriber is allowed to communicate with, and wherein the candidate peers are considered according to the predefined peer-to-peer service rules.

* * * * *